Aug. 20, 1968 N. W. HURSH 3,398,320
DYNAMIC COLOR PURITY APPARATUS
Filed Dec. 14, 1965
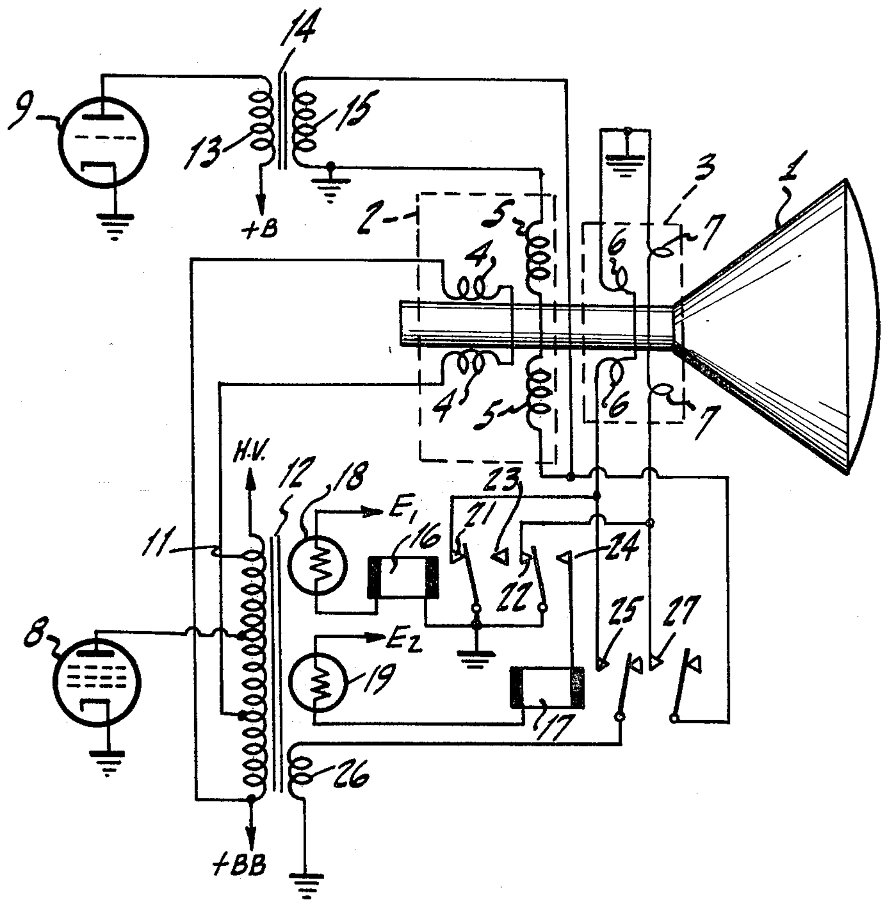
INVENTOR.
NEAL W. HURSH
BY
W. H. Sprague
Attorney United States Patent Office 3,398,320

Patented Aug. 20, 1968

3,398,320

DYNAMIC COLOR PURITY APPARATUS

Neal W. Hursh, Indianapolis, Ind., assignor to Radio Corporation of America, a corporation of Delaware Filed Dec. 14, 1965, Ser. No. 513,739
10 Claims. (Cl. 315—27)

ABSTRACT OF THE DISCLOSURE

An auxiliary deflection system is provided to control wide-angle beam deflection. An auxiliary deflection yoke is inductively energized from the main deflection yoke to shift the deflection center of the main yoke in a first sense under normal temperatures. As the temperature rises, the inductive energization of the auxiliary yoke is interrupted. For still higher temperatures the auxiliary yoke is energized by the vertical and horizontal deflection wave sources to shift the deflection center of the main deflection yoke opposite to the first sense. The amount of the shift varies as a function of the beam deflection angle.

This invention relates to cathode ray tube deflection systems and particularly to apparatus by which to control wide angle beam deflection in television picture tubes such as, for example, shadow mask type color picture tubes.

In order to achieve wide angle beam deflection with good color purity in shadow mask color television picture tubes, it is necessary not only to maintain accurate coincidence of the effective horizontal and vertical deflection centers, but also to insure that the effective deflection centers are proper under all conditions to direct the electron beams through the appropriate apertures in the shadow mask to strike the desired phosphor elements. The beam deflection apparatus in such a cathode ray tube must effect not only the wide angle deflection of the beams to scan a raster at the luminescent screen, but also must function with a minimum of coma, astigmatism, degrouping and other undesired electron-optical effects. When the deflection angle becomes relatively great, such as 90° or more, it is difficult to design a snigle yoke by which to achieve all of the desired results. These problems become more severe when the neck of the cathode ray tube is decreased in diameter, which is in conformity with present trends, because one or more of the beams tends to strike the neck of the tube and, consequently, will not reach the luminescent screen.

Another problem encountered with wide angle beam deflection systems is that resulting from structural deformations occurring within the picture tube itself under varying temperature conditions. For example, the shadow mask in a color television picture tube may become distorted relative to the phosphor screen at elevated temperatures. It is desirable that some modification of one or both of the effective beam deflection centers be made as some function of the temperatures within the tube. Such deflection center modification is particularly desirable in rectangular tubes because of the tendency of a rectangularly shaped shadow mask to become unsymmetrically distorted at elevated temperatures. Distortions of the character described, detract from color purity in such picture tubes.

It, therefore, is an object of the present invention to provide a beam deflection system by which to modify the effective horizontal and/or vertical deflection centers of a cathode ray picture tube as functions of both the angle of beam deflection and of the environmental temperature.

In accordance with this invention, there is provided a deflection system for a cathode ray picture tube which includes a main deflection yoke which is energizable from suitable deflection wave sources to deflect one or more electron beams suitably to scan a substantially rectangular raster at a target electrode. The system also includes an auxiliary deflection yoke which is energizable suitably to modify the effective deflection center of the main yoke. The apparatus for energizing the auxiliary yoke includes two relays, the first of which has contacts which, under normal temperature conditions, prevent the energization of the second relay and also provides a circuit for the auxiliary yoke so that it is inductively energized from the main yoke. By such energization, the effective deflection center is shifted from its normal point in one direction (e.g. backward) relative to the luminescent screen and the amount of such shift varies as a function of the beam deflection angle. The first relay contacts also are effective under elevated temperature conditions to effect the energization of the second relay and also to interrupt the inductive energization of the auxiliary yoke so that the beam deflection center is determined only by the main yoke. The second relay, when it is energized, has contacts which, under still more elevated temperature conditions, effect the energization of the auxiliary yoke from the deflection wave sources. By such latter energization the effective deflection center is shifted in an opposite direction (e.g., forward) relative to that of the first shift and the amount of the second shift is varied as a function of the beam deflection angle. The respective relay operations are made responsive to the desired temperature conditions by including in each energizing circuit a thermistor which so changes the energizing current for the relays that they operate in the described manner in response to predetermined temperature conditions.

For a better understanding of the invention, reference now is made to the following description which is taken in conjunction with the accompanying drawing.

The single figure of the drawing is a schematic circuit diagram of a portion of a television receiver embodying the color purity apparatus of the invention.

In the drawing, a shadow mask type of color television picture tube 1 is provided with a main deflection yoke 2 and an auxiliary deflection yoke 3. The color picture tube may be a 25 inch RCA type 25AP22 which has a substantially rectangular screen and is one in which the three electron beams are deflected by means including the yoke 2 through angles up to approximately 90°. It will be understood, however, that the invention may also be used with other types of picture tubes such as, for example, a 21 inch RCA type 21FBP22A which has a round screen and is one in which the electron beams are deflected through angles up to approximately 70°. The main deflection yoke 2 may be of the 90° variety such as disclosed in Patent Number 3,169,207 granted Feb. 9, 1965, to M. J. Obert and R. L. Barbin, when a picture tube of the 25 inch rectangular variety is used. The yoke 2 alternatively may be of the type disclosed in Patent Number 2,824,267 granted Feb. 18, 1958, to W. H. Barkow, when a picture tube of the 70° round variety is used. It is to be understood that the present invention is not limited to use with such tubes as those referred to, but also may be used with substantially equal facility with other types of tubes such as a 19 inch rectangular tube identified by RCA type number 19EYP22.

The main deflection yoke 2 has a pair of horizontal deflection coils 4 and a pair of vertical deflection coils 5.

The auxiliary deflection yoke 3 also has a pair of horizontal deflection coils 6 and a pair of vertical deflection coils 7. The auxiliary yoke may take any of the forms shown in the concurrently filed application of R. L. Barbin, Ser. No. 513,774, filed Dec. 14, 1965, and titled "Auxiliary Beam Deflection Yoke." The auxiliary yoke may be mounted in front of the main deflection yoke 2 as shown in the drawing or alternatively behind the main yoke as desired.

The beam deflection circuit includes horizontal and vertical output tubes 8 and 9 which, it will be understood, are suitably driven in a conventional manner by substantially sawtooth voltage waves respectively at the line end field repetition rates. The output circuit of the horizontal output tube is connected to a winding 11 of a horizontal output transformer 12. The horizontal deflection coils 4 of the main deflection yoke 2 are connected to the transformer winding 11 in a conventional manner.

The vertical output tube 9 is connected to the primary winding 13 of a vertical output transformer 14, the secondary winding 15 of which is connected to the vertical deflection coils 5 of the main deflection yoke 2.

The horizontal and vertical deflection coils 6 and 7 of the auxiliary deflection yoke 3, are connected to the contacts of a pair of relays 16 and 17 for suitable energization to effect a desired shifting of the effective deflection center of the main yoke 2. The relays 16 and 17 have energizing circuits which include thermistors 18 and 19 respectively. These thermistors are mounted in a part of the chassis which experiences temperature variations comparable to and/or representative of the temperature changes to which the shadow mask and associated parts of the picture tube 1 are subjected. As an example, thermistors 18 and 19 may be mounted on the core of the horizontal output transformer 12. Although not necessarily limited thereto, the thermistor 18 has a positive temperature coefficient whereby its resistance increases with heat and the thermistor 19 has a negative temperature coefficient whereby its resistance decreases with heat.

When a television receiver embodying the invention is first turned on for operation, both of the thermistors 18 and 19 are relatively cool. Hence, the low resistance of the thermistor 18 enables sufficient current to flow through the winding of relay 16 to connect the contacts 21 and 22 to ground as shown. The horizontal and vertical coils 6 and 7 respectively, of the auxiliary yoke 3 are energized inductively from the corresponding horizontal and vertical coils 4 and 5 respectively of the main deflection yoke 2. Such energization of the auxiliary yoke coils effectively modifies the deflection center of the main deflection yoke 2 by shifting it away from the picture screen end of the tube 2, for example.

At a particular elevated temperature of the core of the horizontal output transformer 12, the resistance of the thermistor 18 increases to a point such that the current through the winding of relay 16 is incapable of maintaining the contacts 21 and 22 connected to ground. Instead, contacts 23 and 24 become connected to ground thereby closing an energizing circuit through the winding of relay 17 and the thermistor 19. At this point, however, the resistance of the thermistor 19 is too high to permit sufficient current flow in the winding to operate the relay 17. As a result, the horizontal and vertical coils 6 and 7, respectively, of the auxiliary yoke 3 are open circuited, whereby the auxiliary yoke has no effect on the deflection center of the electron beams. This point is determined solely by the main deflection yoke 2.

At a still higher temperature, however, the resistance of the thermistor 19 decreases sufficiently to operate the relay 17 so as to connect the contact 25 to an auxiliary winding 26 on the horizontal output transformer 12 and to connect the contact 27 to the secondary winding 16 of the vertical output transformer. The pulsating voltages produced in the winding 26 of the horizontal output transformer 12, effect a substantially sawtooth current flow at the line repetition rate through horizontal coils 6 of the auxiliary yoke 3. The connection of the vertical coils 7 of the auxiliary yoke 3 in parallel with the vertical coils 5 of the main deflection yoke 2 effects a sawtooth current flow at the field repetition rate through the auxiliary yoke coils. Such energization of the coils of the auxiliary yoke 3 modifies the effective deflection center of the main yoke 2 by shifting it forwardly toward the picture end of the tube 1, for example.

It will be understood that the thermistors 18 and 19 need not have the particular temperature characteristics described. Instead, they may have characteristics opposite to those described or they may have identical characteristics. For example, if the thermistor 18 has a negative temperature coefficient such that the relay 16 doesn't operate until an elevated temperature is reached, it requires only a reversal of the circuit connections to contacts 21 and 23 and to 22 and 24 to have the auxiliary yoke energized in the manner described.

The apparatus shown and described constitutes a practical beam deflection system which operates to modify the effective deflection center of a cathode ray picture tube as functions of the angle of beam deflection and of the environmental temperature.

What is claimed is:

1. In a deflection system for a cathode ray picture tube and including a main deflection yoke energizable from horizontal and vertical deflection wave sources to deflect an electron beam horizontally and vertically to scan a substantially rectangular raster at a target electrode and also including an auxiliary deflection yoke energizable to modify the effective deflection center of said main yoke, apparatus for energizing said auxiliary yoke comprising:

means operative under normal temperature conditions to effect inductive energization of said auxiliary yoke from said main yoke, whereby to modify in one sense the effective deflection center of said main yoke as a function of the deflection angle of said beam; and means operative under elevated temperature conditions to effect energization of said auxiliary yoke from said horizontal and vertical deflection wave sources, whereby to modify in another sense opposite to said first sense the effective deflection center of said main yoke as a function of the deflection angle of said electron beam.

2. In a deflection system for a cathode ray picture tube and including a main deflection yoke energizable from horizontal and vertical deflection wave sources to deflect an electron beam horizontally and vertically to scan a substantially rectangular raster at a target electrode and also including an auxiliary deflection yoke energizable to modify the effective deflection center of said main yoke, apparatus for energizing said auxiliary yoke comprising:

first relay contact means operative under normal temperature conditions to effect inductive energization of said auxiliary yoke from said main yoke, whereby to modify in one sense the effective deflection center of said main yoke as a function of the deflection angle of said beam; and second relay contact means operative under elevated temperature conditions to effect energization of said auxiliary yoke from said horizontal and vertical deflection waves sources, whereby to modify in another sense opposite to said first sense the effective center of said main yoke as a function of the deflection angle of said electron beam.

3. In a deflection system for a cathode ray picture tube and including a main deflection yoke energizable from horizontal and vertical deflection wave sources to deflect an electron beam horizontally and vertically to scan a substantially rectangular raster at a target electrode and also including an auxiliary deflection yoke energizable to modify the effective deflection center of said main yoke, apparatus for energizing said auxiliary yoke comprising:

first and second relays;

first contact means on said first relay operative under normal temperature conditions to effect inductive energization of said auxiliary yoke from said main yoke, whereby to modify in one sense the effective deflection center of said main yoke as a function of the deflection angle of said beam, said first contact means being effective under higher than normal temperature conditions to disable said inductive energization of said auxiliary yoke, whereby to effect no modification of the effective deflection center of said main yoke; and second contact means on said second relay operative under still higher than normal temperature conditions to effect energization of said auxiliary yoke from said horizontal and vertical deflection wave sources, whereby to modify in another sense opposite to said first sense the effective deflection center of said main yoke as a function of the deflection angle of said electron beam.

4. In a deflection system for a cathode ray picture tube and including a main deflection yoke energizable from horizontal and vertical deflection wave sources to deflect an electron beam horizontally and vertically to scan a substantially rectangular raster at a target electrode and also including an auxiliary deflection yoke energizable to modify the effective deflection center of said main yoke, apparatus for energizing said auxiliary yoke comprising:

first and second relays;

first contact means on said first relay effective in one position under normal temperature conditions to prevent energization of said second relay and to enable inductive energization of said auxiliary yoke from said main yoke, whereby to modify in one sense the effective deflection center of said main yoke as a function of the deflection angle of said beam, said first contact means being effective in another position under elevated temperature conditions to effect energization of said second relay and to disable said inductive energization of said auxiliary yoke, whereby to effect no modification of the effective deflection center of said main yoke; and second contact means on said energized second relay effective under elevated temperature conditions to effect energization of said auxiliary yoke from said horizontal and vertical deflection wave sources, whereby to modify in another sense opposite to said first sense the effective deflection center of said main yoke as a function of the deflection angle of said electron beam.

5. Auxiliary deflection yoke energizing apparatus as defined in claim 4 wherein:

said first contact means in said one position completes a circuit through said auxiliary yoke and in said other position interrupts said auxiliary yoke circuit and completes an energizing circuit for said second relay under elevated temperature conditions.

6. Auxiliary deflection yoke energizing apparatus as defined in claim 4 wherein:

said first contact means is operated from said one position to said other position at a first elevated temperature; and said second contact means is operated at a second elevated temperature higher than said first elevated temperature.

7. Auxiliary deflection yoke energizing apparatus as defined in claim 4 wherein:

said first and second relays have respective energizing circuits each including a resistor whose value changes as a function of temperature.

8. Auxiliary deflection yoke energizing apparatus as defined in claim 4 wherein:

said first relay has an energizing circuit including a resistor whose value changes in one sense as a function of temperature; and said second relay has an energizing circuit including a resistor whose value changes in a sense opposite to said first sense as a function of temperature.

9. Auxiliary deflection yoke energizing apparatus as defined in claim 4 wherein:

said first relay has an energizing circuit including a series-connected resistor having a positive temperature coefficient; and said second relay has an energizing circuit including a series-connected resistor having a negative temperature coefficient.

10. In a deflection system for a cathode ray picture tube and including a main deflection yoke having horizontal and vertical coils energizable respectively from horizontal and vertical deflection wave sources to deflect an electron beam horizontally and vertically to scan a substantially rectangular raster at a luminescent screen and also including an auxiliary deflection yoke having horizontal and vertical coils energizable to modify the effective deflection center of said main yoke, apparatus for energizing said auxiliary yoke comprising:

a first relay having a first energizing circuit connecting it to a power supply;

said first energizing circuit including a first resistor having a relatively low value at a normal temperature, whereby to activate said first relay and a relatively high value at an elevated temperature whereby to deactivate said first relay;

a second relay having a second energizing circuit connecting it to a power supply;

said second energizing circuit including a second resistor having a relatively high value at a normal temperature, whereby to inhibit actuation of said second relay and having a relatively low value at an elevated temperature, whereby to effect actuation of said second relay;

contact means on said first relay when actuated rendering said second energizing circuit incomplete and completing circuits to effect inductive energization of the horizontal and vertical coils of said auxiliary yoke respectively from the horizontal and vertical coils of said main yoke, whereby to shift the effective deflection center of said main yoke away from said screen as a function of the deflection angle of said beam, said contact means on said first relay when not actuated completing said second energizing circuit and rendering said inductive energizing circuits incomplete so as to disable said inductive energization of said auxiliary yoke coils, whereby to effect no modification of the effective deflection center of said main yoke; and contact means on said second relay when actuated connecting the horizontal and vertical coils of said auxiliary yoke respectively to said horizontal and vertical deflection wave sources for energization, whereby to shift the effective deflection center of main yoke toward said screen as a function of the deflection angle of said electron beam.

References Cited

UNITED STATES PATENTS

| | | | |
|---|---|---|---|
| 2,834,901 | 5/1958 | Barkow et al. | 315—27 |
| 2,900,564 | 8/1959 | Barkow | 315—27 |

RODNEY D. BENNETT, *Primary Examiner.*

J. G BAXTER, *Assistant Examiner.*